United States Patent
Aoyagi et al.

(10) Patent No.: US 7,315,402 B2
(45) Date of Patent: Jan. 1, 2008

(54) IMAGE FORMING APPARATUS AND METHOD FOR SELECTING AN OPTIMAL IMAGE SPACE FREQUENCY FOR AN OUTPUT IMAGE

(75) Inventors: Masato Aoyagi, Yokohama (JP); Hiroshi Takahashi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 828 days.

(21) Appl. No.: 10/095,473

(22) Filed: Mar. 13, 2002

(65) Prior Publication Data

US 2002/0131061 A1    Sep. 19, 2002

(30) Foreign Application Priority Data

Mar. 16, 2001    (JP)    ............... A2001-077282

(51) Int. Cl.
   *G06K 15/00*    (2006.01)
(52) U.S. Cl. ............ 358/3.13; 358/3.14; 358/3.16; 358/451
(58) Field of Classification Search ........... 358/1.9, 358/3.06, 3.13–3.24, 533, 534, 536, 1.2, 358/528, 449, 451, 3.11, 270, 298, 299, 465; 382/270, 298, 299
   See application file for complete search history.

(56) References Cited

U.S. PATENT DOCUMENTS

| | | | | |
|---|---|---|---|---|
| 4,651,293 A | * | 3/1987 | Kato | ............... 708/3 |
| 5,321,523 A | * | 6/1994 | Hashimoto | ............... 358/3.21 |
| 5,424,854 A | * | 6/1995 | Hashimoto | ............... 358/3.17 |
| 5,471,543 A | * | 11/1995 | Ng et al. | ............... 382/173 |
| 5,874,937 A | * | 2/1999 | Kesatoshi | ............... 345/428 |
| 6,002,804 A | * | 12/1999 | Bhaskar et al. | ............... 382/252 |
| 6,055,065 A | * | 4/2000 | Rao et al. | ............... 358/1.9 |

FOREIGN PATENT DOCUMENTS

| | | |
|---|---|---|
| JP | 7-77418 | 8/1995 |
| JP | 2832052 | 9/1998 |
| JP | 2899304 | 12/1999 |
| JP | 2000-76472 | 3/2000 |

* cited by examiner

Primary Examiner—Jerome Grant, II
(74) Attorney, Agent, or Firm—Dickstein Shapiro LLP

(57) ABSTRACT

An image forming apparatus includes an image forming device configured to form an output image using at least two or more image space frequencies and an image size acquisition device configured to recognize a size of the output image. A switching device is configured to select one of the at least two or more image frequencies for the output image according to the size of the output image recognized by the image size acquisition device and to switch the image forming device so as to form the output image using the one of two or more image frequencies.

18 Claims, 9 Drawing Sheets

FIG. 6

WRITING RESOLUTION : 1200*1200dpi
DATA : 1bit/dot

|  | K SCREEN | C SCREEN | M SCREEN | Y SCREEN |
|---|---|---|---|---|
| NUMBER OF LINES (lpi) | 223 | 223 | 223 | 223 |
| NUMBER OF GRADATION | 117 | 117 | 117 | 117 |
| SCREEN ANGLE | 68.2 | −68.2 | 21.8 | −21.8 |
| MATRIX SIZE | 58*58 | 58*58 | 58*58 | 58*58 |
| DOT SIZE OF BASIC MATRIX | 29dot | 29dot | 29dot | 29dot |
| NUMBER OF SUB MATRIX | 4 | 4 | 4 | 4 |

FIG. 7

WRITING RESOLUTION : 1200*1200dpi
DATA : 1bit/dot

|  | K SCREEN | C SCREEN | M SCREEN | Y SCREEN |
|---|---|---|---|---|
| NUMBER OF LINES (lpi) | 112 | 112 | 112 | 112 |
| NUMBER OF GRADATION | 117 | 117 | 117 | 117 |
| SCREEN ANGLE | 68.2 | −68.2 | 21.8 | −21.8 |
| MATRIX SIZE | 58*58 | 58*58 | 58*58 | 58*58 |
| DOT SIZE OF BASIC MATRIX | 116dot | 116dot | 116dot | 116dot |
| NUMBER OF SUB MATRIX | 1 | 1 | 1 | 1 |

IMAGE FORMING APPARATUS AND METHOD FOR SELECTING AN OPTIMAL IMAGE SPACE FREQUENCY FOR AN OUTPUT IMAGE

BACKGROUND OF THE INVENTION

1. Field of the Invention

The present application claims priority and contains subject matter related to Japanese Patent Application No. 2001-077282 filed in the Japanese Patent Office on Mar. 16, 2001, and the entire contents of which are hereby incorporated by reference.

The present invention relates to an image forming apparatus and an image forming method for selecting an optimal image space frequency for an output image, and a recording medium storing computer program instructions for performing selection of an optimal image space frequency for an output image.

2. Discussion of the Background

A dither method has been known as a technology for performing halftone processing for inputted image data. A dither method uses a threshold matrix composed of a plurality of thresholds (called a dither pattern) in halftone processing inputted image data, and the inputted image is binarized as black when the inputted image data is larger than a corresponding threshold of the matrix and white when the inputted image data is equal to or smaller than the corresponding threshold, thereby reproducing a halftone image.

In halftone processing of image data using a dither method, if the same threshold matrix is used for each image data of the same image quality (e.g., density) having different resolutions, it may occur that the image quality of an output image of each inputted image data is different from each other even though an original image of each inputted image data has the same image quality, causing a problem of inability of accurately reproducing an image of inputted image data.

A technology described in Japanese Patent No. 2832052 aims to solve the above-described problem, and is designed to acquire similar results even when inputted image data of the same image quality is different from each other in resolution by preparing a dither matrix for each resolution.

As enlargement/reduction methods used for enlarging and reducing characters, line images and the like, there have been known an SPC method, a logical sum method, a 9-division method, a high-speed projection method, a distance inverse proportion method, and the like. When these enlargement/reduction methods are applied to image data processed by a dither method, gradation information of an original image of the image data may be lost or moire fringes may be generated to deteriorate the quality of an output image of the image data.

In relation to the above-described problem in enlargement/reduction of dither-processed image data, Japanese Patent Application Laid-Open Publication No. 216476/1987 describes a technology, in which a group of original pixels located near a transformed pixel acquired by position change are selected as reference pixels, a density of the transformed pixel is obtained from binarized patterns of the selected reference pixels, and then data of the obtained density is binarized according to an organized dither method. According to the technology described in Japanese Patent Application Laid-Open Publication No. 216476/1987, after transformed pixels are acquired by position changing carried out according to a specified transformation magnification, a group of original pixels is selected as reference pixels for each of the transformed pixels, the number of black pixels among the reference pixels is specified as a density of the transformed pixel, and the acquired density of the transformed pixel is binarized by an organized dither method.

The use of the technology described in Japanese Patent Application No. 216476/1987 may solve the problem of image quality deterioration generated by the application of a SPC method or the like for enlargement/reduction of dither-processed image data. However, in enlargement, transformed pixels using the same group of original pixels as the reference pixels are processed assuming that they are similar in density. Consequently, edge portions of an output image of the dither-processed image data may be blurred.

In relation to the above-described problem of image quality deterioration following enlargement/reduction of dither-processed image data, another technology has been proposed in Japanese Patent No. 2899304 to selectively subject dither-processed image data generated according to an organized dither method to a second dithering process functioning as an aperture for the dither-processed image data.

Generally, various objects for processing are laid out in a document, such as images (e.g., bit-map images), characters containing character information and attribute information for the characters such as one regarding a character size or a font, and graphics containing coordinate information inputted by using a pointing device and attribute information for the graphics. Each of the objects for processing is edited and processed by manipulation of each attribute information, so that the document is formed. The formed document is printed and outputted by a printer.

In the above-described printing and outputting process of a document, a resizing process such as interpolation and thinning (pixel skipping) is carried out for images to be matched with a predetermined printing output size, thereby generating image data for printing. For characters and graphics, bit-map images thereof are generated with an outputting resolution based on data of the characters or graphics after having been laid out. The bit-map images of resized images and those of characters and graphics are synthesized to form a printing image.

Thus, because data of a document includes information of a layout of the document and a printing image of each object for processing, laying out or printing of the printing image can be carried out by manipulating the information included in the data of the document, and it is not necessary, for example, to read image data of an image, which has been read before by an image scanner or the like, again in laying out or printing and outputting of the image data.

Among various objects for processing included in a document, the object for processing regarding characters or graphics does not require a large storage capacity because the object only includes information for defining shapes of characters and graphics and attribute information for the characters and graphics such as one regarding color or filling pattern thereof. On the other hand, the object for processing regarding a bit-map image requires an information storage capacity considerably larger than that for the object regarding characters or graphics because information of a bit-map image is based on a pixel unit.

In addition, as for the object for processing regarding characters or graphics, even when sizes of the characters or graphics are changed for example in printing and outputting of the characters or graphics, it is only necessary to change information defining shapes of the characters or graphics according to a printing output size. Accordingly, the quantity of data of an object regarding characters or graphics does not change significantly even when sizes of the characters or graphics are changed.

On the other hand, as for the object for processing regarding a bit-map image, when the size of an output image is increased, data of the bit-map image is adjusted by interpolation. Consequently, resolution of the output image is lowered, for example, causing a reduction in the image quality. To prevent such a reduction in image quality, an image must be read with a resolution suitable for printing and outputting of an output image, which leads to increasing the size of resulting image data. If an image is thus read beforehand using a relatively large data size according to the size of an output image, image data of the large data size must be processed in laying out work on a computer screen not related to the size of an output image, causing considerable slowing down in screen updating or laying out work on the computer. Thus, for carrying out quick laying out work on the computer, the computer requires a memory of a relatively large capacity and a CPU of a relatively high-speed operation.

In relation to the above-described problem, a technology is described in Japanese Patent Application Laid-Open Publication No. 2000-76472. According to this technology, image data of an image read with a low resolution is used in laying out work of the image, and in printing and outputting of the image, based on information of an original image read with the low resolution and information of the size of an output image, a resolution optimal for printing and outputting is set at an image reading device, the image is read again by the image reading device with the set resolution, and image data thus obtained is used.

Generally, when an image is seen, a certain angle of visual field is set. Further, a visual distance is set relatively small when a relatively small image is seen (e.g., an image at the distance "a" in FIG. 3), while the visual distance is set relatively large when a relatively large image is seen (e.g., an image at the distance "b" in FIG. 3).

Also, depending on the type of a design or the kind of an image or graphic to be seen, the required image space frequency varies. For example, the required image space frequency varies between an image of a human face and an image of a simple graphic or a design painted by one color.

Further, it is known that when performance of an image forming apparatus affects quality of a formed image and when image data is halftone processed with a dither process in the image forming apparatus, the quality of an output image may be more stable when the number of dither lines of a dither pattern (matrix) of the dither process is relatively small than when the number of dither lines of the dither pattern is relatively large. Generally, a processing method is employed, where the number of dither lines of a dither pattern is set relatively small to improve granularity or graininess and uniformity of an output image, and the number of dither lines is set relatively large to improve definition of the output image. However, in the above-described processing method, because no consideration has been given to a relation between a size of an output image and a visual distance for the output image, it often occurs that the quality of the output image is not satisfactory.

SUMMARY OF THE INVENTION

The present invention has been made in view of the above-discussed and other problems and addresses the above-discussed and other problems.

Preferred embodiments of the present invention provide a novel image forming apparatus and a novel image forming method capable of selecting an optimal image space frequency for an output image by balancing a stable image quality and a visual requirement for each size of the output image.

According to a preferred embodiment of the present invention, an image forming apparatus includes an image forming device configured to form an output image using two or more image space frequencies and an image size acquisition device configured to recognize a size of the output image. A switching device selects one of the two or more image frequencies for the output image according to the size of the output image recognized by the image size acquisition device and switches the image forming device so as to form the output image using one of the two or more image frequencies.

According to another preferred embodiment of the present invention, an image forming apparatus includes an image forming device configured to form an output image using two or more image space frequencies and an output size acquisition device configured to recognize a size of an output sheet for the output image. A switching device is configured to select one of the two or more image space frequencies for the output image according to the size of the output sheet for the output image recognized by the output size acquisition device and to switch the image forming device so as to form the output image using one of the two or more image space frequencies.

According to still another preferred embodiment of the present invention, an image forming apparatus includes an image forming device configured to form an output image using two or more image space frequencies, an output size acquisition device configured to recognize a size of an output sheet for the output image, and an image size acquisition device configured to recognize a size of the output image. A switching device is configured to select one of the two or more image space frequencies for the output image according to the size of the output sheet for the output image recognized by the output size acquisition device and the size of the output image recognized by the image size acquisition device and to switch the image forming device so as to form the output image using one of two or more image space frequencies.

In each of the above-described image forming apparatuses, the switching device may be configured to select one of the two or more image space frequencies for the output image and to switch the image forming device so as to form the output image using one of the two or more image frequencies in a multi-step manner.

Further, in the above-described image forming apparatus, the switching device may select the one of the two or more image frequencies for the output image by comparing the size of the output image recognized by the image size acquisition device with a predetermined criterion output image size. In this case, the predetermined criterion image size may be based on a visual characteristic.

Furthermore, in the above-described image forming apparatus, the size of the output image recognized by the image size acquisition device may include a size of a side of the output image in a predetermined direction. In this case, the switching device selects the one of at least two or more image space frequencies for the output image based on the size of a side of the output image in the predetermined direction.

Still furthermore, in the above-described image forming apparatus, the size of the output image recognized by the image size acquisition device may include sizes of the output image in vertical and horizontal directions. In this case, the switching device selects the one of at least two or more image space frequencies for the output image based on the sizes of the output image in vertical and horizontal directions.

Further, in the above-described image forming apparatus, the switching device may be configured to calculate area of the output image from the size of the output image recognized by the image size acquisition device and to select the one of two or more image space frequencies for the output image based on the area.

Furthermore, in the above-described image forming apparatus, the image size acquisition device may be configured to recognize, when the output image includes a plurality of output images in a same page, respective sizes of the plurality of output images in the same page. In this case, the switching device is configured to select, when the output image includes a plurality of output images in a same page, one of the two or more image space frequencies for the plurality of output images in the same page based on one of the respective sizes of the plurality of output images in the same page recognized by the image acquisition device and to switch the image forming device so as to form each of the plurality of images in the same page using one of two or more image space frequencies.

Still furthermore, in the above-described image forming apparatus, the image size acquisition device may be configured to recognize, when the output image includes a plurality of output images in a same file, respective sizes of the plurality of output images in the same file. In this case, the switching device is configured to select, when the output image includes a plurality of output images in a same file, one of the two or more image space frequencies for the plurality of output images in the same file based on one of the respective sizes of the plurality of output images in the same file recognized by the image acquisition device and to switch the image forming device so as to form each of the plurality of images in the same file using one of two or more image space frequencies.

Further, in each of the above-described image forming apparatuses, the image forming device may include a plurality of dither patterns, each having substantially the same basic tone. In this case, the plurality of dither patterns may have predetermined screen angles respectively that are substantially identical to each other.

Furthermore, each of the above-described image forming apparatus may further include a selecting method setting device configured to set at the switching device a selecting method for selecting one of two or more image space frequencies for the output image.

According to another preferred embodiment of the present invention, an image forming method includes the steps of recognizing a size of an output image, selecting one of at least two or more image space frequencies for the output image based on the size of the output image recognized in the recognizing step, and forming the output image using one of two or more image space frequencies selected in the selecting step.

According to still another preferred embodiment of the present invention, an image forming method includes the steps of recognizing a size of an output sheet for an output image, selecting one of two or more image space frequencies for the output image based on the size of the output sheet for the output image recognized in the recognizing step, and forming the output image using the image space frequency selected in the selecting step.

According to still another preferred embodiment of the present invention, an image forming method includes the steps of recognizing a size of an output image, recognizing a size of an output sheet for the output image, selecting one of two or more image space frequencies for the output image based on the size of the output image recognized in the output image size recognizing step and the size of the output sheet for the output image recognized in the output sheet size recognizing step, and forming the output image using the image space frequency selected in the selecting step.

In each of the above-described image forming methods, the selecting step may select the one of two or more image space frequencies for the output image in a multi-step manner. In this case, the forming step forms the output image using one of two or more image space frequencies in the multi-step manner.

Further, in the above-described image forming methods, the selecting step may include comparing the size of the output image recognized in the image size recognizing step with a predetermined criterion output image size. In this case, the predetermined criterion output image size may be based on a visual characteristic.

Further, in the above-described image forming methods, the recognizing step may include recognizing a size of a side of the output image in a predetermined direction. In this case, the selecting step includes selecting the one of at least two or more image space frequencies for the output image based on the size of a side of the output image in the predetermined direction.

Furthermore, in the above-described image forming methods, the recognizing step may include recognizing sizes of the output image in vertical and horizontal directions. In this case, the selecting step includes selecting one of two or more image space frequencies for the output image based on the sizes of the output image in vertical and horizontal directions.

Still furthermore, in the above-described image forming method, the selecting step may include calculating the area of the output image from the size of the output image recognized in the recognizing step and selecting the one of at least two or more image space frequencies for the output image based on the area.

Further, in the above-described image forming method, when the output image includes a plurality of output images in a same page, the recognizing step may include recognizing respective sizes of the plurality of output images in the same page. In this case, the selecting step includes selecting one of two or more image space frequencies for the plurality of output images in the same page according to one of the respective sizes of the plurality of output images in the same page, and the image forming step includes forming each of the plurality of output images in the same page using one of two or more image space frequencies selected in the selecting step.

Furthermore, in the above-described image forming method, when the output image includes a plurality of output images in the same file, the recognizing step may include recognizing respective sizes of the plurality of output images in the file. In this case, the selecting step includes selecting one of two or more image space frequencies for the plurality of output images in the file, and the image forming step includes forming each of the plurality of output images in the file using the image space frequency selected in the selecting step.

Further, in each of the above-described image forming methods, the image forming step may form the output image using a plurality of dither patterns, each having substantially the same basic tone.

Furthermore, in each of the above-described image forming methods, in the image forming step, the plurality of dither patterns may have predetermined screen angles respectively that are substantially identical to each other.

Furthermore, each of the above-described image forming methods may further include the step of setting a selecting method for selecting the image space frequencies for the output image.

According to another preferred embodiment of the present invention, a computer readable medium stores computer program instructions which when executed by a computer perform an image forming operation including the steps of recognizing a size of an output image; selecting one of two or more image space frequencies for the output image based on the size of the output image recognized in the recognizing step; and forming the output image using the one image space frequency selected in the selecting step.

According to still another preferred embodiment of the present invention, a computer readable medium stores computer program instructions which when executed by a computer performs an image forming operation including the steps of: recognizing a size of an output sheet for an output image; selecting one of two or more image space frequencies for the output image based on the size of the output sheet for the output image recognized in the recognizing step; and forming the output image using the one of two or more image space frequencies selected in the selecting step.

According to still another preferred embodiment of the present invention, a computer readable medium stores computer program instructions which when executed by a computer performs an image forming operation including the steps of recognizing a size of an output image; recognizing a size of an output sheet for the output image; selecting one of two or more image space frequencies for the output image based on the size of the output image recognized in the output image size recognizing step and the size of the output sheet for the output image recognized in the output sheet size recognizing step; and forming the output image using the one of two or more image space frequencies selected in the selecting step.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 6 is a table indicating a dither specification of a large number of dither lines for 1200×1200 dpi resolution;

FIG. 7 is a table indicating a dither specification of a small number of dither lines for 1200×1200 dpi resolution;

DETAILED DESCRIPTION OF THE PREFERRED EMBODIMENTS

Figure 1:
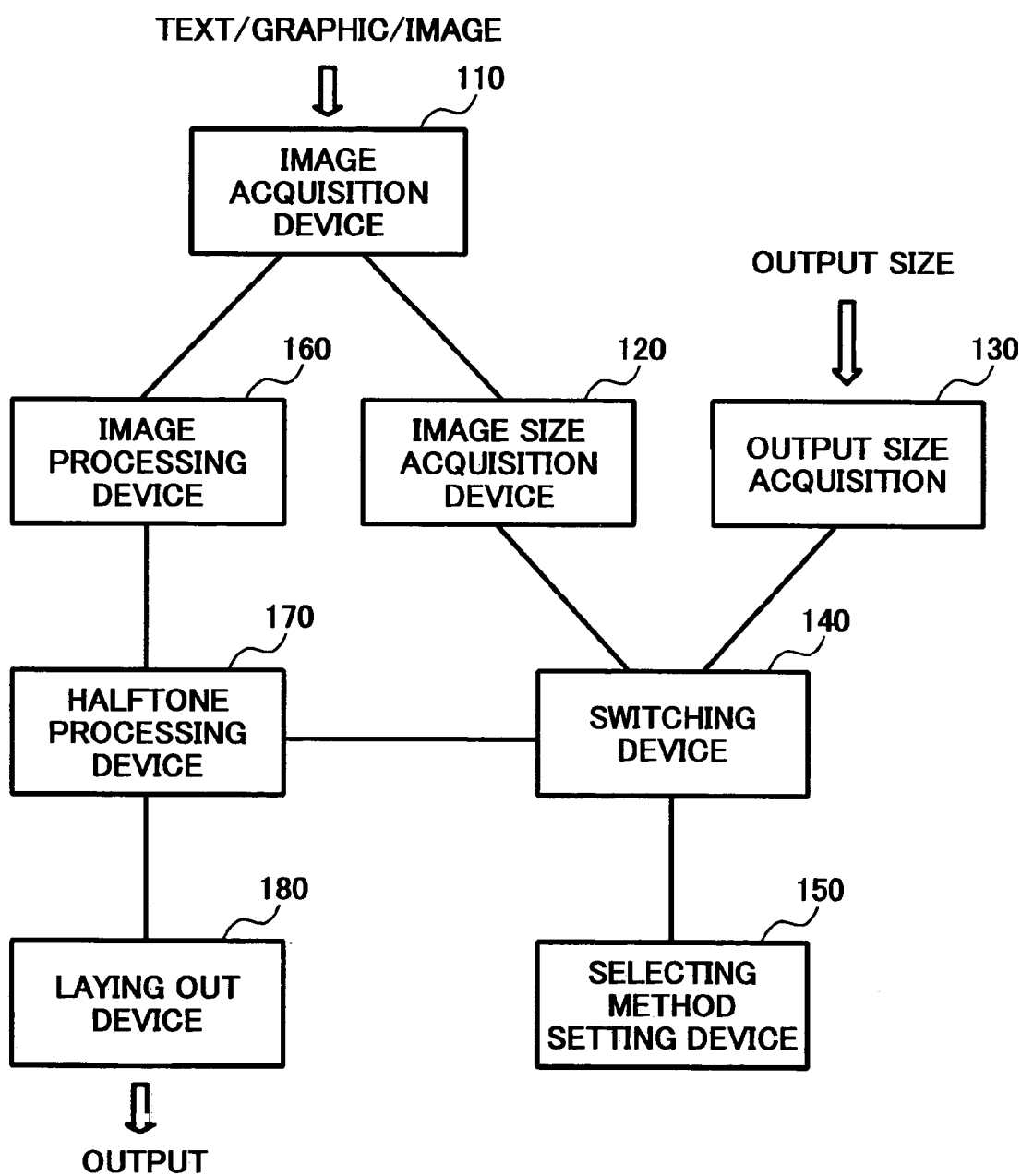
FIG. 1 is a functional block diagram illustrating an image forming apparatus according to a preferred embodiment of the present invention.

Referring now to the drawings, wherein like reference numerals designate identical or corresponding parts throughout the several views, preferred embodiments of the present invention are described.

FIG. 1 is a functional block diagram illustrating an image forming apparatus according to a preferred embodiment of the present invention.

The image forming apparatus includes an image acquisition device 110, an image size acquisition device 120, an output size acquisition device 130, a switching device 140, a selecting method setting device 150, an image processing device 160, a halftone processing device 170, and a laying out device 180.

The image forming apparatus is configured to receive from an application or the like computer image data for outputting and an outputting command for the image data, with a size of an outputting sheet for the image data specified. Upon receiving the output command and the image data for outputting, the image forming apparatus is operated in the following manner.

The image acquisition device 110 fetches text data, graphic data or image data as image data by any one of, or a combination of the following operations, and performs color adjustment for the image data:

1) fetching image data of an image from an input device such as a scanner;
2) reading image data from a file;
3) receiving image data from a computer connected to a network; and
4) fetching text, graphic or image data outputted from an application program.

The image data is configured to include data of a coordinate, i.e., data of a position on a sheet (starting point, and horizontal and vertical widths), data for determining a size of an output image (resolution, magnification ratio or the like), and original image data.

The image data fetched by the image acquisition device 110 is subjected to ink generation/base color removal, total quantity regulation, density adjustment with engine gamma, and enlargement/reduction by the image processing device 160, and then passed to the halftone processing device 170.

At the halftone processing device 170, the number of dither lines for processing the image data is switched by the switching device 140 to one selected by the switching device 140, and a dither/error diffusion process is carried out for the image data with the selected number of dither lines, so that the image data is converted to match a characteristic of an output device, and then the image data is passed to the laying out device 180.

The laying out device 180 executes laying out of the image data with other objects for processing to provide printing data.

If the image data fetched by the image acquisition device 110 only includes image data of an image, the fetched image data is directly sent to the image size acquisition device 120.

The image size acquisition device 120 recognizes, when the image data is of an image, a size of the image (e.g., sizes of the image in vertical and horizontal directions), and sends information of the size of the image to the switching device 140. In this case, the image size acquisition device 120 may recognize either a size of an image when the image is outputted on an output sheet or a size of the image when the image is read. In the embodiment, the image size acquisition device 120 is configured to recognize a size of an output image on an outputting sheet.

If an output sheet size is directly used for a condition for selecting an image space frequency, the image size acquisition device 120 receives image data acquired by the image acquisition device 110, after having been processed by the image processing device 160, from the image processing device 160, instead of receiving the image data from the image acquisition device 110.

In addition, if the image data is of graphics, the image data is sent to the image size acquisition device 120 after rasterization, and thus the image data can be processed in a similar manner as described above for the image data of an image.

The output size acquisition device 130 may calculate the size of an output sheet for the image data based on an output sheet size (A4, A2, B5 or the like) specified by the output command from the application program or the like and the resolution of an output device, and then sends the result to the switching device 140.

The switching device 140 selects an image space frequency for forming an output image of the image data based on the size of the output image or the size of an output sheet for the image data. Specifically, the switching device 140 selects an image space frequency for an output image of image data, for example, by selecting the number of dither lines for halftone processing the image data at the halftone processing device 170.

For example, if the criterion size for a side of an output image for switching the number of dither lines to be used in halftone processing is set to 5 cm, when the resolution for an output image is 1200 dpi, the corresponding number of dots (dot size) of the side of the output image of 5 cm on a surface of an output sheet is (5/2.54)*1200=about 2362 dots. In this case, if the dot size (the number of dots) of an image to be outputted is equal to or greater than 2362 dots, the dither line of 112 lines is selected in halftone processing of the image data so that the halftone processing for the output image is carried out by the dither line of 112 lines, and when the dot size of the output image is smaller than 2362 dots, the dither line of 223 lines is selected so that the halftone processing for the output image is carried out by 223 lines.

The selecting method setting device 150 allows setting one of later described selecting methods for selecting one of image space frequencies at the switching device 140. The selecting method setting device 150 may be configured to allow setting of not selecting any image space frequencies, i.e., selecting not to switch the image space frequency set at the switching device 140.

The switching device 140 performs selection of an image space frequency based on the size of an output image or the size of an output sheet (e.g., a sheet size) or the like according to one of the following methods, set by the selecting method setting device 150.

a) An image space frequency for an output image is selected based on a size of one side of the output image.

Determination as to which side of an output image, a longer side or a shorter side, is to be used in selecting an image space frequency for the output image is made by not only considering a size of a vertical or horizontal width of the output image, but also considering a visual characteristic (described later).

Figure 2:
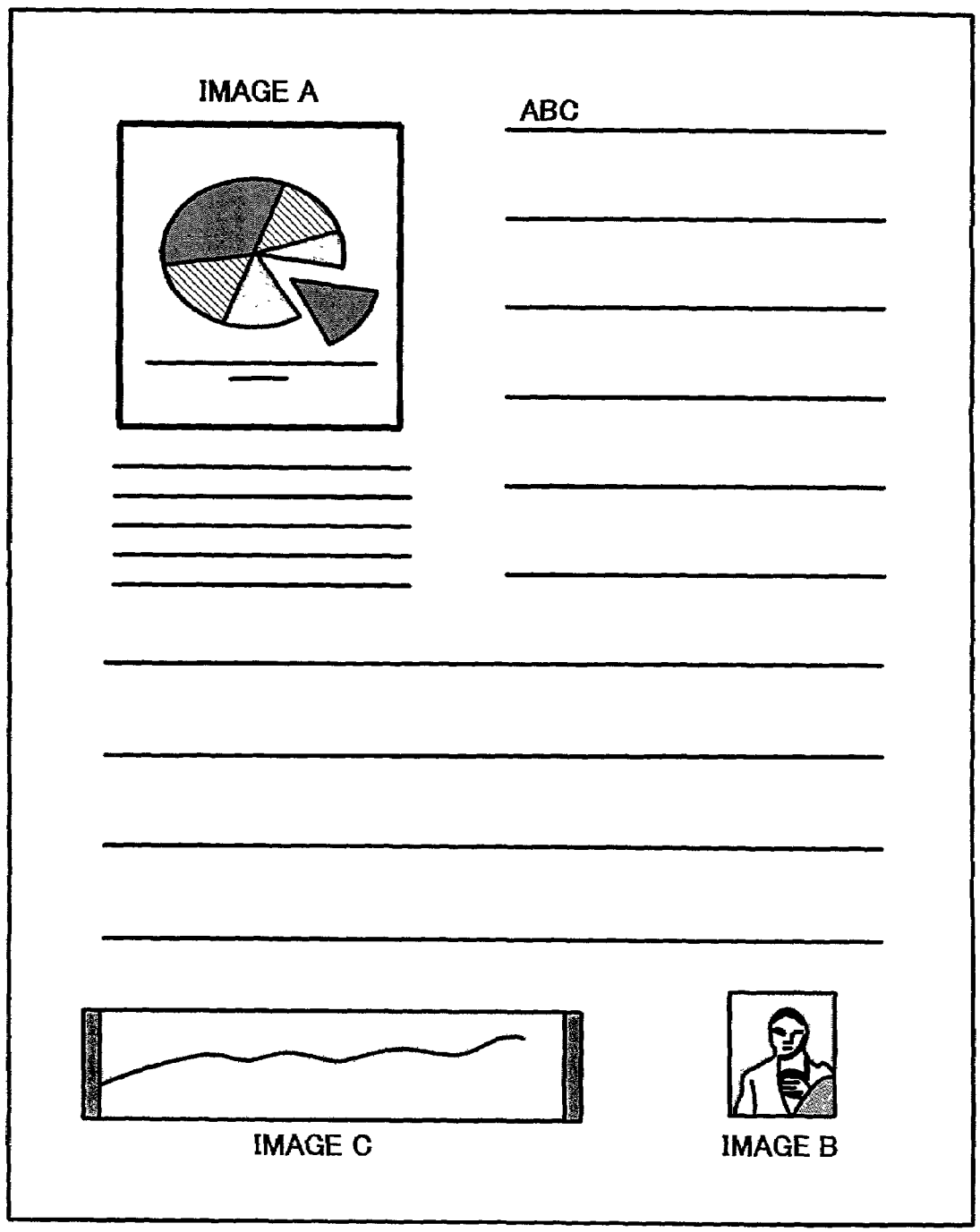
FIG. 2 is a diagram illustrating a layout of a document.

For example, taking an example of a document including a plurality of images, illustrated in FIG. 2, images A, B and C respectively represent images of medium, small and horizontally long sizes. Horizontal straight lines represent sentences. For the images A and B, having similar vertical and horizontal sizes, for example, the image space frequency to be used may be selected based on either of the respective vertical and horizontal sizes.

For the image A, because of its relatively large size, a relatively small image space frequency may be used, and for the image B, because of its relatively small size, a relatively large image space frequency may be used.

The image C is an image having a horizontally long size and accordingly it may not be necessary to look into the image C. Therefore, the image C may be subjected to processing similar to that for the image A. Processing similar to that for the image B may be also applied to the image C based on a size of a smaller side of the image C.

When an image is vertically long, experience shows that looking-into is more frequent than that in the case of a horizontally long image. Therefore, in the case of a vertically long image, although either of the vertical or horizontal size can be used for selecting the image frequency to be used in processing the vertically long image, it is advisable to use the horizontal width.

b) An image space frequency for an output image is selected based on sizes of the output image in vertical and horizontal directions.

For example, vertical and horizontal widths of an image are respectively set to T and Y, and (T+Y) is set as a parameter for selection of an image space frequency for the image. In addition, for a vertically or horizontally long image described above in (a), vertical and horizontal sizes may be compared with each other, and selection of an image space frequency for the image may be made by using a smaller one of the vertical and horizontal sizes.

c) An image space frequency for an output image is selected based on area of the output image.

Vertical and horizontal widths of an image are respectively set to T and Y, and (T*Y), i.e., area of the image, is set as a parameter for selection of an image space frequency for the image.

d) A criterion image size for selecting an image space frequency for an output image is determined considering a relation between the size of the output image and a visual distance.

Figure 3:
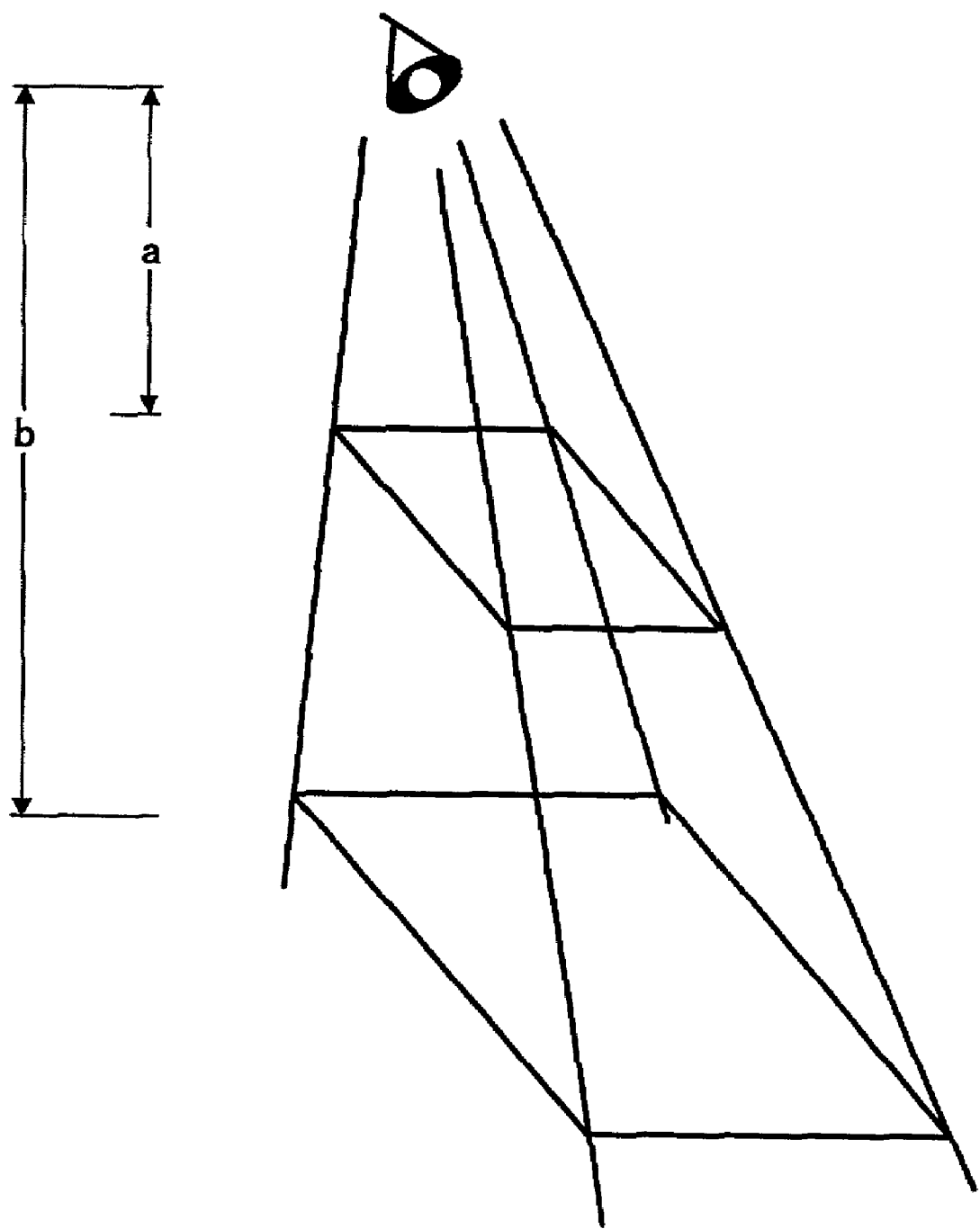
FIG. 3 is a schematic drawing for explaining a visual distance.

As illustrated in FIG. 3, if a normal visual distance is "b", and a distance when an image is generally looked into is "a", then "a" may be about half of "b".

Here, the visual distance is generally set to 35 cm. Accordingly, if the size of an output sheet is about A4, an image having a side of 2 to 3 cm (e.g., a stamp) on the output sheet of A4 may be looked into. Thus, the size of an output image at which the image space frequency is to be switched may be about equal to the size of a stamp (2 to 3 cm) though depending on the contents of the output image.

In the embodiment, the size of a side of an output image at which the number of dither lines to be used in processing image data for the output image is switched is set to 3 cm. The above-described numbers of dither lines, 112 lines and 223 lines, and the above-described size of a side of an output image, 3 cm, at which the image space frequency for the output image is to be switched have been determined as a result of considering a visual characteristic as described above. However, the above-described numbers of dither lines and the above-described size of an output image for switching the image space frequency may be set differently.

Figure 4:
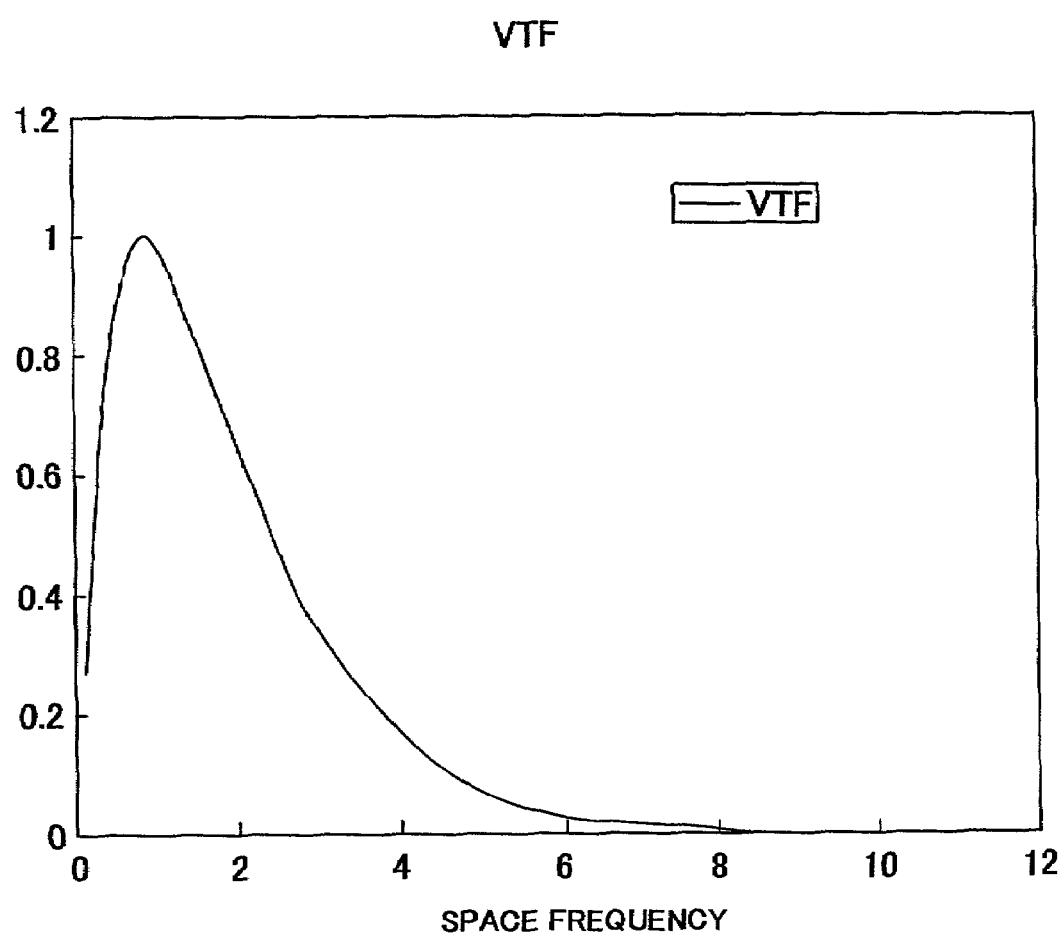
FIG. 4 is a graph showing a visual characteristic.

Here, the visual characteristic, i.e., the visual space frequency characteristic (MTF), is expressed, as illustrated in FIG. 4, by human visual sensitivity VTF (Visual Transfer Function) with respect to an image frequency at an observation distance of 350 mm. A technology using VTF is disclosed for example in Japanese Patent Application Laid-Open Publication No. 23191/1998. In FIG. 4, the human visual sensitivity VTF decreases as the image frequency of an image increases, reaching a considerably low level at 8 cycle/mm (200 line/inch) or higher. The human visual sensitivity VTF reaches a level where the basic tone of an image, e.g., a pattern of halftone, cannot be recognized at all at the image frequency of 10 cycle/mm (250 line/inch).

On the other hand, when the observation distance is changed, the visual characteristic is also changed in proportion. When the observation distance reaches half of the above observation distance, i.e., 175 mm, the basic tone of an image can be recognized at an image space frequency of twice the above frequency.

e) An image space frequency for an output image is selected based on the size of an output sheet for the output image.

When the size of an output sheet recognized by the output size acquisition device 130 is equal to A4 or smaller, processing is carried out at the dither line of 223 lines, and at the dither line of 112 lines when the size of the output sheet is larger than A4.

An image space frequency may be also selected based on the size of an output image and the size of an output sheet for the output image. For example, the size of a side of an output image at which the image space frequency for the output image is to be switched may be set to 3 cm for the output sheet equal to A4 or smaller, and to 5 cm for the output sheet larger than A4 (for example, a poster size), and either of the dither lines of 223 lines and 112 lines is selected according to the size of an output image and the size of an output sheet for the output image. Specifically, when an output sheet is equal to A4 or smaller, if the size of a side of an output image is equal to 3 cm or smaller, the dither line of 223 lines is selected and if the size of a side of the output image is greater than 3 cm, the dither line of 112 lines is selected, and when an output sheet is larger than A4, if the size of a side of an output image is equal to 5 cm smaller, the dither line of 223 lines is selected, and if the size of a side of the output image is greater than 5 cm, the dither line of 112 lines is selected.

f) Image space frequencies for a plurality of output images in the same page are set equal.

In outputting a page of a document including a plurality of output images, the size of each of the plurality of output images between a beginning of the page and an end of the page is recognized, and the image space frequency for outputting the plurality of output image in the same page is selected based on one of the sizes, e.g., any one of large, medium and small image sizes.

g) Image space frequencies for a plurality of output images in the same file are set equal.

In outputting a file including image data of a plurality of output images, image data of each of the plurality of output images in the file is verified if it is in the same file, the size of image data of each image is recognized, and then the image space frequency for outputting the file is selected as in the case of (f).

Alternatively, the size of image data of each image in a file may be pre-recorded in the file as file information, and this size may be used instead of recognizing the size of image data of each image in the file.

h) Basic tones or screen angles of a plurality of dither patterns used in processing image data are set identical.

Figure 5:
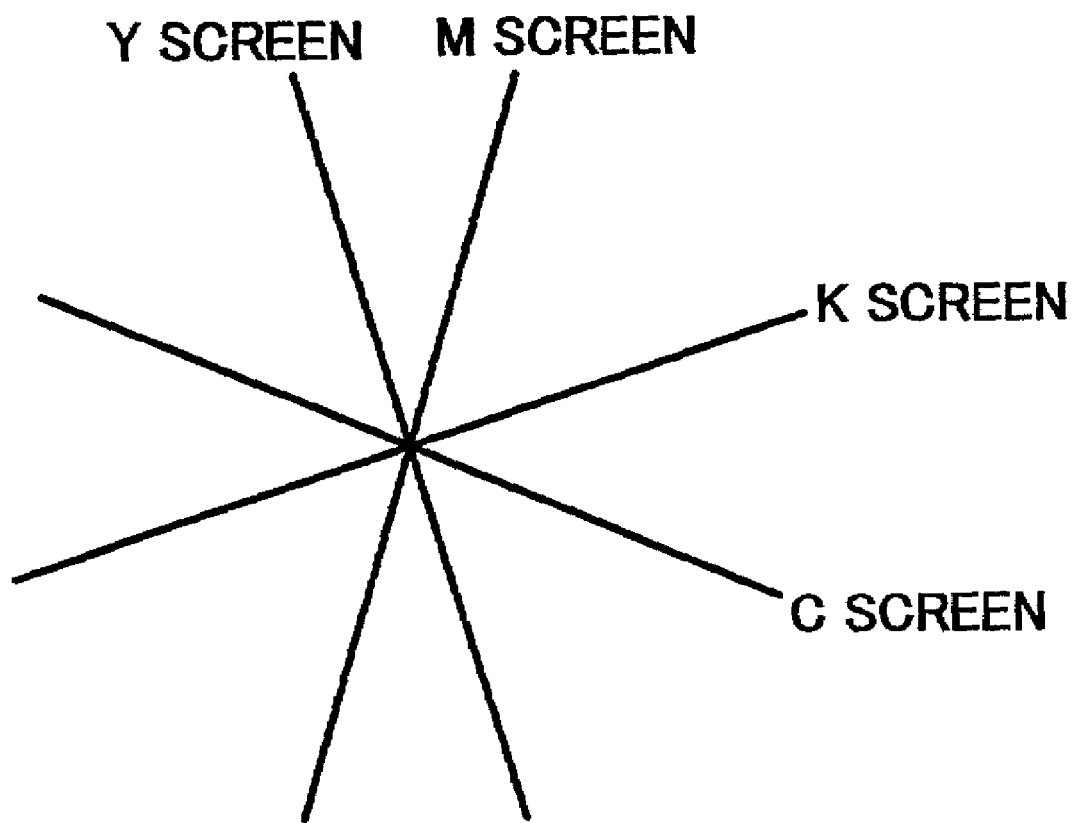
FIG. 5 is a schematic drawing for explaining a full line screen angle.

In the embodiment, for halftone processing of image data, a dither method using a full line screen angle dither pattern is used, where respective basic tones (arrangement of halftone dots) for images of respective colors, Y (yellow), M (magenta), C (cyan), and K (black), are set in line shapes, and screen angles for images of respective colors are set different from each other. The full line screen angle of each color is set as illustrated in FIG. 5. The full line screen angle dither pattern in the embodiment has a dither matrix of a large line number, 223 lines, (FIG. 6) and a dither matrix of a small line number, 112 lines, (FIG. 7) for forming an output image with the resolution of 1200*1200 dpi with one dot expressed by 1 bit, so that the image space frequency of the output image is differently set between when the dither matrix of a large number is used and when the dither matrix of a small number is used. However, the screen angles of respective colors of these two matrices are set substantially identical, and the basic tones in line shapes (arrangement of halftone dots) of respective colors are also similarly formed in these two matrices. Thereby, by using either of these two dither matrices, a stable image is formed by dot-concentration in a line shape and uneven coloring caused by print shifting due to difference in screen angles is avoided.

Moreover, a dither pattern in which halftone dots are concentrated in a circle can also be used instead of the above-described full line screen angle dither pattern.

More accurate switching of image space frequencies can be performed by configuring the above-described step of switching image space frequencies in a multi-step manner. For example, by determining the size of an output image and by selecting for the output image an optimal one among a plurality of dither patterns prepared beforehand, the output image can be more accurately formed.

Specifically, for example, assuming that dither patterns of 100, 150 and 200 lines are provided, switching of dither patterns (lines) is made at a point where the size of an output image is 15 cm or higher and a point where the size of an output image is 3 cm or lower. With respect to the number of dots of a side of an image on a surface of an output sheet, if the output resolution is 1200 dpi, switching determination is made at a point where the number of dots of a side of an image is (15/2.54)*1200=7086 dots or more and a point where the number of dots of a side of an image is (3/2.54) *1200=1417 dots or less. In the embodiment, when the size of a side of an output image is equal to 15 cm or greater, the dither line of 100 lines is selected, when the size of a side of the output image is smaller than 15 cm and equal to 3 cm or greater, the dither lien of 150 lines is selected, and when the size of a side of the output image is smaller than 3 cm, the dither line of 200 lines is selected.

The switching of the image space frequency in image formation of an output image is carried out based on the size of the output image by switching of dither patterns used in halftone processing of image data of the output image, which is easy in operation. However, the image space frequency in image formation of an output image may be switched based on the size of the output image even when other halftone processing methods such as an error diffusion method is used for image data of the output image.

Thus, by switching the image space frequency for an output image based on the size of the output image as described above, it is possible to establish a balance between stabilizing the quality of the output image and meeting a visual requirement for the output image.

Specifically, when an output image is relatively large, in halftone processing image data of the output image by a dither method, the image data is processed at a small number of dither lines because the large output image is seen from away, thereby stabilizing the quality of the output image, and when the output image is relatively small, e.g., a stamp size image, the image data is processed at a large number of dither lines because the small output image is looked into, thereby achieving increased definition of the output image.

Further, by selecting the image space frequency for an output image in a multi-step manner, it is possible to select the image space frequency more optimally meeting a visual requirement.

Furthermore, by adding a human visual characteristic in determining a criterion output image size for switching the image space frequency for an output image, it is possible to establish a more accurate balance between stabilizing the quality of the output image and meeting the visual requirement for the output image.

Furthermore, by paying attention to a feature of the size of an image, e.g., long in horizontal or vertical direction, it is possible to perform more accurate selection of the image space frequency.

Still furthermore, by setting image space frequencies to be equal for each of a plurality of images in the same page, it is possible to more accurately process each of the plurality of images in the same page.

Further, by setting image space frequencies to be equal for each of a plurality of images in the same file, it is possible to more accurately process each of the plurality of images in the same file.

Furthermore, because whether to perform and not to perform switching of the image space frequencies can be selected, it is possible to increase a degree of freedom in selecting the quality of an output image.

Further, by setting basic tones of a plurality of dither patterns (screens) to be substantially identical to each other, it is possible to prevent a visual sense of incompatibility likely to occur when one image data is processed using one of the plurality of dither patterns having a basic tone (arrangement of halftone dots) and another image data is processed using another one of the plurality of dither patterns having a different basic tone.

Also, by setting screen angles of a plurality of dither patterns (screens) substantially identical to each other, it is possible to prevent a visual sense of incompatibility likely to occur when one image data is processed using one of the plurality of dither patterns having a set of screen angles and another image data is processed using another one of the plurality of dither patterns having a different set of screen angles.

Further, because the image space frequency is switched depending on the size of an output sheet, when the size of an output sheet is large such as a poster size, a stable image can be formed on the output sheet by using a relatively small number of dither lines, and when the size of the output sheet is relatively small, a stable and satisfactory image can be formed by using a relatively large number of dither lines.

Furthermore, because consideration is given to both of the size of an output image and the size of an output sheet for the output image in selecting an image space frequency for the output image, it is possible to form the output image in a visually better manner.

Figure 8:
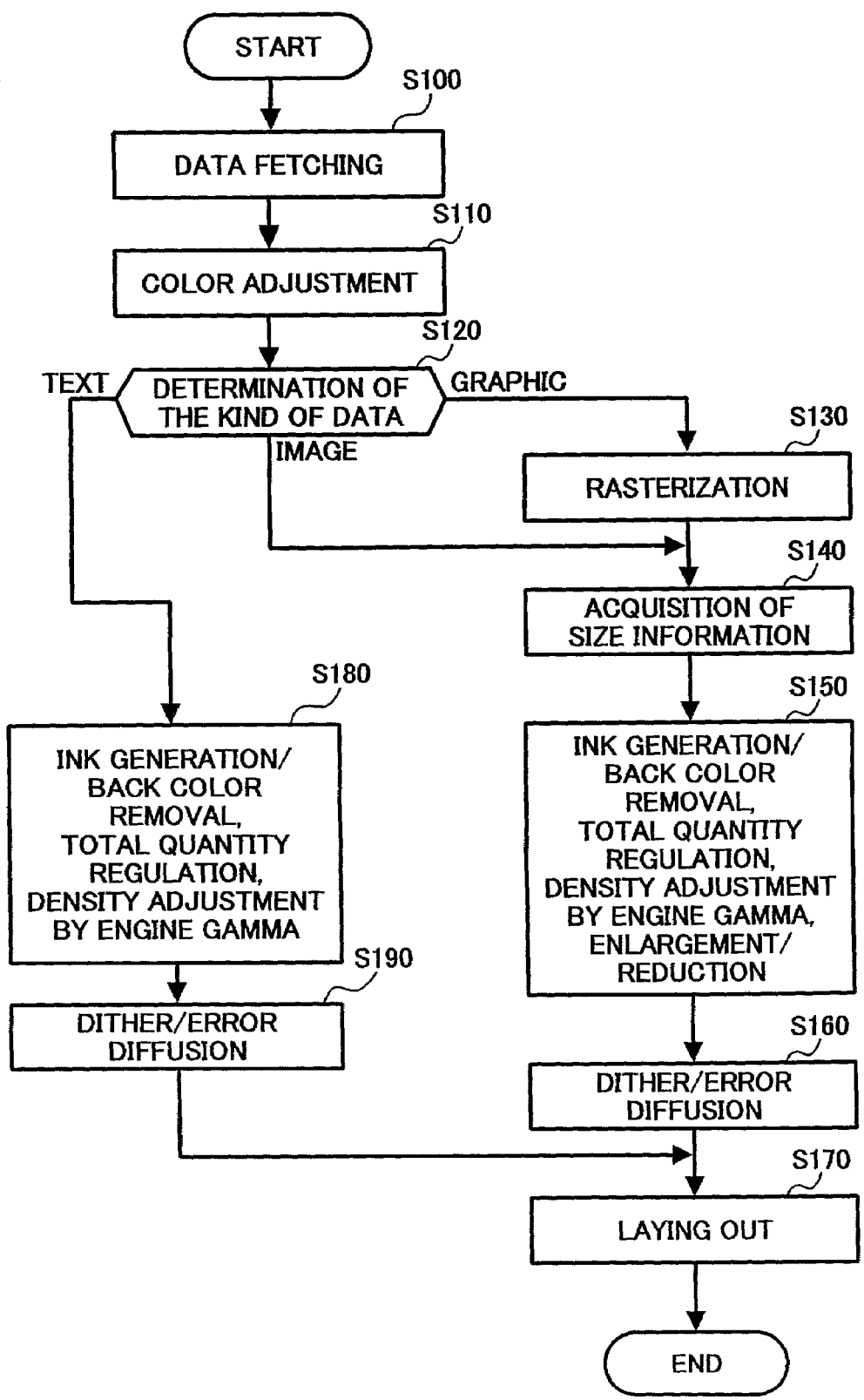
FIG. 8 is a flowchart for explaining a process of operation of the image forming apparatus of the present invention.

FIG. 8 is a flowchart showing a processing flow of an operation of the above-described image forming apparatus, according to a preferred embodiment of the present invention.

The image forming apparatus outputs an image in the manner described below by specifying image data, an output command for the image data, and the size of an output sheet for outputting the image data, received from an application or the like of a computer.

Text, graphics or image data that has been received is fetched as image data (step S100), and color adjustment is carried out for the image data (step S110).

The type of the fetched data, whether the data is text, graphic or image data, is determined (step S120).

If the data is graphic data, rasterization is carried out for the data (step S130), and then the process proceeds to step S140.

If the data is text data, ink generation/base color removal, total quantity regulation, and density adjustment by engine gamma are carried out for the data (step S180), dither or error diffusion halftone processing is carried out for the data so that the data is converted to match a characteristic of an output device (step S190), and then the process proceeds to step S170.

If the data is image data, the process proceeds to step S140.

In step S140, information of the size of the image data (the size in a vertical or horizontal direction) and the size of an output sheet for outputting the image data are acquired.

Then, the image data is subjected to ink generation/base color removal, total quantity regulation, density adjustment by engine gamma, and enlargement/reduction (step S150).

Based on the size information acquired in step S140 (see (2) and (3) above), the number of dither lines for processing the data is switched, and dither or error diffusion halftone processing is performed for the data, with the switched number of dither lines, so that the data is converted to match a characteristic of an output device (step S160), and then the process proceeds to step S170.

In step S170, the halftone processed data is laid out with other objects for processing, so that printing data of the image data matching with the output sheet is provided.

The processes from step S100 to step S170 are repeated until all the image data of one page is processed, and outputting is carried out after completion of processing of all the image data of one page.

The above-described process is repeated until processing of all the image data is completed, and thereby processing of the image data according to the output command from the application program is finished.

Figure 9:
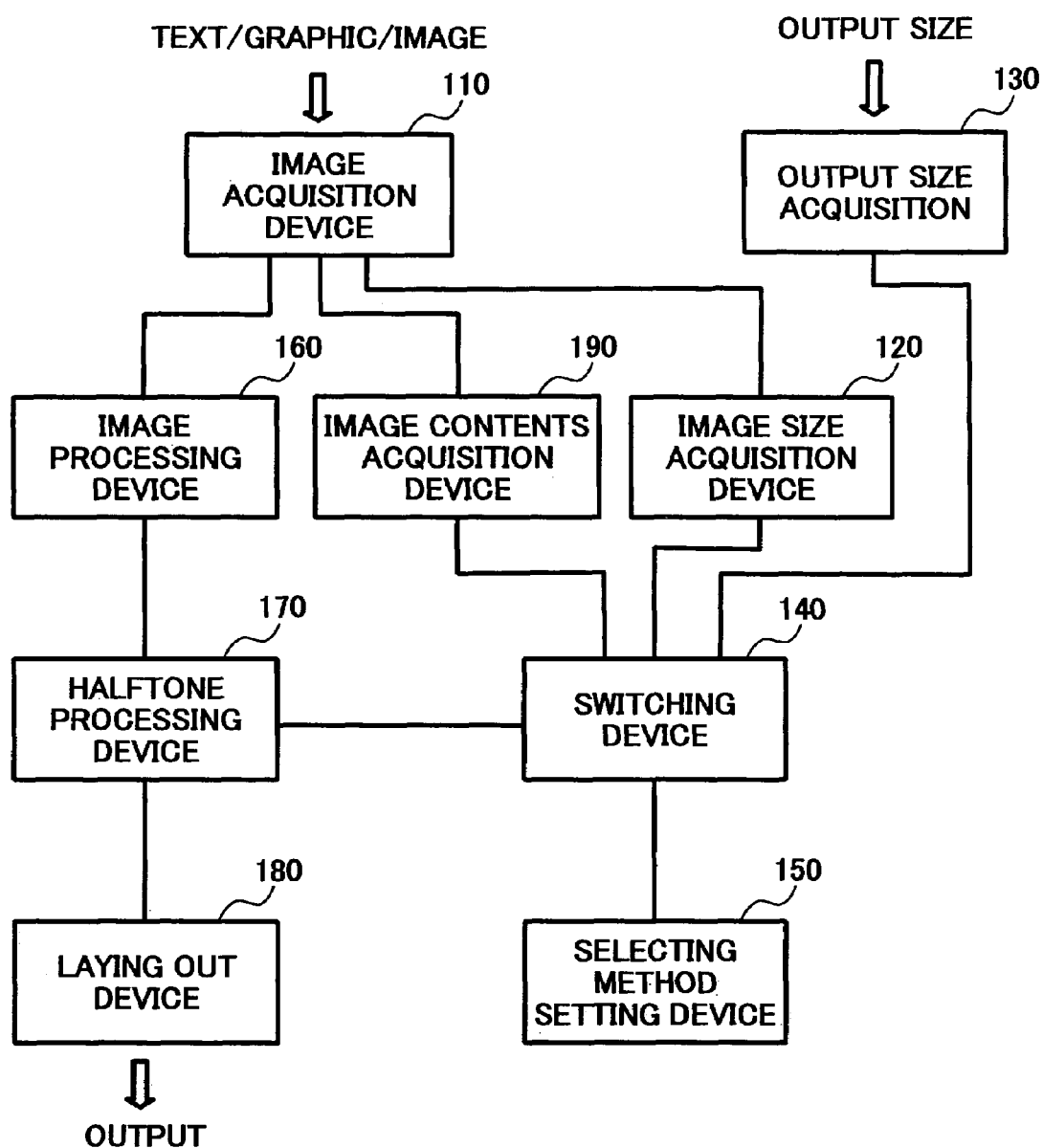
FIG. 9 is a functional block diagram illustrating an image forming apparatus according to another preferred embodiment of the present invention.

FIG. 9 is a functional block diagram illustrating an image forming apparatus according to another preferred embodiment of the present invention. The image forming apparatus has a substantially same construction as that of the previous embodiment except that an image contents acquisition device 190 is additionally provided. The image contents acquisition device 190 is configured to determine the contents of image data acquired by the image acquisition device 110. For example, the image contents acquisition device 190 determines if the contents of image data is a photograph or illustration. In the embodiment, the switching device 140 may be configured for example such that the size of a side of an output image at which the image space frequency to be switched is set to 3 cm when the contents of image data is a photograph, and to 5 cm when the contents of image data is an illustration, and either of the dither lines of 223 lines and 112 lines is selected according to the size of an output image and the contents of the output image. Specifically, when the contents of image data is a photograph, if the size of a side of an output image is equal to 3 cm or smaller, the dither line of 223 lines is selected, and if the size of a side of the output image is greater than 3 cm, the dither line of 112 lines is selected, and when the contents of image data is an illustration, if the size of a side of an output image is equal to 5 cm smaller, the dither line of 223 lines is selected, and if the size of a side of the output image is greater than 5 cm, the dither line of 112 lines is selected.

The object of the present invention can also be achieved by programming each function of the image forming apparatus for realizing the foregoing embodiment, writing it in a recording medium such as a ROM beforehand, and executing the program.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letter Patent of the United States is:

1. An image forming apparatus, comprising:
an image forming device configured to form an output image onto a sheet by at least two or more dither patterns;
an image area size acquisition device configured to recognize a size of an area of the output image to be formed on the sheet;
a switching device configured to select one of the at least two or more dither patterns for the output image according to the size of the area of the output image recognized by the image area size acquisition device and to switch the image forming device so as to form the output image by the one of the at least two or more dither patterns;
wherein the image size acquisition device is configured to recognize, when the output image includes a plurality of output images in a same page, respective sizes of the plurality of output images in the same page, and
wherein the switching device is configured to select, when the output image includes a plurality of output images in a same page, one of the at least two or more dither patterns for the plurality of output images in the same page based on one of the respective sizes of the plurality of output images in the same page recognized by the image acquisition device, and to switch the image forming device so as to form each of the plurality of output images in the same page using the one of at least two or more dither patterns.

2. An image forming apparatus, comprising:
an image forming device configured to form an output image onto a sheet by at least two or more dither patterns;
an image area size acquisition device configured to recognize a size of an area of the output image to be formed on the sheet;
a switching device configured to select one of the at least two or more dither patterns for the output image according to the size of the area of the output image recognized by the image area size acquisition device and to switch the image forming device so as to form the output image by the one of the at least two or more dither patterns;
wherein the image area size acquisition device is configured to recognize, when the output image includes a plurality of output images in a same file, respective sizes of the plurality of output images in the same file, and
wherein the switching device is configured to select, when the output image includes a plurality of output images in a same file, one of the at least two or more dither patterns for the plurality of output images in the same file based on one of the respective sizes of the plurality of output images in the same file recognized by the image acquisition device, and to switch the image forming device so as to form each of the plurality of output images in the same file using the one of at least two or more dither patterns.

3. An image forming apparatus, comprising:
an image forming device configured to form an output image onto a sheet by at least two or more dither patterns;
an image area size acquisition device configured to recognize a size of an area of the output image to be formed on the sheet;
a switching device configured to select one of the at least two or more dither patterns for the output image according to the size of the area of the output image recognized by the image area size acquisition device and to switch the image forming device so as to form the output image by the one of the at least two or more dither patterns;
wherein the image forming device includes a plurality of dither patterns, each having a substantially same basic tone; and
wherein the plurality of dither patterns have predetermined screen angles respectively that are substantially identical to each other.

4. An image forming apparatus, comprising:
an image forming device configured to form an output image outputted onto a sheet by at least two or more dither patterns;
an output size acquisition device configured to recognize a size of an output sheet for the output image;
a switching device configured to select one of the at least two or more dither patterns for the output image according to the size of the output sheet size for the output image recognized by the output size acquisition device and to switch the image forming device so as to form the output image using the one of the at least two or more dither patterns;
wherein the image forming device includes a plurality of dither patterns, each having a substantially same basic tone; and
wherein the plurality of dither patterns have predetermined screen angles respectively that are substantially identical to each other.

5. An image forming apparatus, comprising:
an image forming device configured to form an output image onto a sheet by at least two or more dither patterns;
an output size acquisition device configured to recognize a size of an output sheet for the output image;
an image area size acquisition device configured to recognize a size of the area of the output image to be formed on the sheet;
a switching device configured to select one of the at least two or more dither patterns for the output image according to the size of an area of the output image recognized by the output area size acquisition device and the size of the area of the output image recognized by the image area size acquisition device and to switch the image forming device so as to form the output image using the one of at least two or more dither patterns;
wherein the image forming device includes a plurality of dither patterns, each having a substantially same basic tone; and wherein the plurality of dither patterns have predetermined screen angles respectively that are substantially identical to each other.

6. An image forming method, comprising the steps of:
recognizing a size of an output image;
selecting one of at least two or more dither patterns for the output image based on the size of an area of the output image recognized in the recognizing step;
forming the output image outputted onto a sheet using the one of at least two or more dither patterns selected in the selecting step; and
wherein when the output image includes a plurality of output images in a same page, the recognizing step includes recognizing respective sizes of the plurality of output images in the same page, the selecting step includes selecting one of at least two or more dither patterns for the plurality of output images in the same page according to one of the respective sizes of the plurality of output images in the same page, and the image forming steps includes forming each of the plurality of output images in the same page using the one of at least two or more dither patterns selected in the selecting step for the plurality of output images in the same page.

7. An image forming method, comprising the steps of:
recognizing a size of an output image;
selecting one of at least two or more dither patterns for the output image based on the size of an area of the output image recognized in the recognizing step;
forming the output image outputted onto a sheet using the one of at least two or more dither patterns selected in the selecting step; and
wherein when the output image includes a plurality of output images in a same file, the recognizing step includes recognizing respective sizes of the plurality of output images in the same file, the selecting step includes selecting one of at least two or more dither patterns for the plurality of output images in the same file, and the image forming step includes forming each of the plurality of output images in the same file using the one of at least two or more dither patterns selected in the selecting step for the plurality of output images in the same file.

8. An image forming method, comprising the steps of:
recognizing a size of an output image;
selecting one of at least two or more dither patterns for the output image based on the size of an area of the output image recognized in the recognizing step;
forming the output image outputted onto a sheet using the one of at least two or more dither patterns selected in the selecting step; and
wherein in the image forming step a plurality of dither patterns have screen angles of predetermined directions respectively that are substantially identical to each other.

9. An image forming method, comprising the steps of:
recognizing a size of an output sheet for an output image;
selecting one of at least two or more dither patterns for the output image based on the size of the output sheet for the output image recognized in the recognizing step;
forming the output image outputted onto a sheet using the one of at least two or more dither patterns selected in the selecting step; and
wherein in the image forming step a plurality of dither patterns have screen angles of predetermined directions respectively that are substantially identical to each other.

10. An image forming method, comprising the steps of:
recognizing a size of an area of an output image;
recognizing a size of an output sheet for the output image;
selecting one of at least two or more dither patterns for the output image based on the size of the area of the output image recognized in the output image size recognizing step and the size of the output sheet for the output image recognized in the output sheet size recognizing step;
forming the output image outputted onto a sheet using the one of at least two or more dither patterns selected in the selecting step; and
wherein in the image forming step a plurality of dither patterns have screen angles of predetermined directions respectively that are substantially identical to each other.

11. A computer readable medium storing computer program instructions which when executed by a computer performs an image forming operation comprising the steps of:
recognizing a size of an area of an output image;
selecting one of at least two or more dither patterns for the output image based on the size of the area of the output image recognized in the recognizing step;
forming the output image onto a sheet using the one of at least two or more dither patterns selected in the selecting step; and
wherein when the output image includes a plurality of output images in a same page, the recognizing step includes recognizing respective sizes of the plurality of output images in the same page, the selecting step includes selecting one of at least two or more dither patterns for the plurality of output images in the same page according to one of the respective sizes of the plurality of output images in the same page, and the image forming steps includes forming each of the plurality of output images in the same page using the one of at least two or more dither patterns selected in the selecting step for the plurality of output images in the same page.

12. A computer readable medium storing computer program instructions which when executed by a computer performs an image forming operation comprising the steps of:
recognizing a size of an area of an output image;
selecting one of at least two or more dither patterns for the output image based on the size of the area of the output image recognized in the recognizing step;
forming the output image onto a sheet using the one of at least two or more dither patterns selected in the selecting step; and
wherein when the output image includes a plurality of output images in a same file, the recognizing step includes recognizing respective sizes of the plurality of output images in the same file, the selecting step includes selecting one of at least two or more dither patterns for the plurality of output images in the same file, and the image forming step includes forming each of the plurality of output images in the same file using the one of at least two or more dither patterns selected in the selecting step for the plurality of output images in the same file.

13. A computer readable medium storing computer program instructions which when executed by a computer performs an image forming operation comprising the steps of:
recognizing a size of an area of an output image;

selecting one of at least two or more dither patterns for the output image based on the size of the area of the output image recognized in the recognizing step;

forming the output image onto a sheet using the one of at least two or more dither patterns selected in the selecting step; and wherein in the image forming step a plurality of dither patterns have screen angles of predetermined directions respectively that are substantially identical to each other.

14. A computer readable medium storing computer program instructions which when executed by a computer performs an image forming operation comprising the steps of:

recognizing a size of an output sheet for an output image;

selecting one of at least two or more dither patterns for the output image based on the size of the output sheet for the output image recognized in the recognizing step;

forming the output image outputted onto a sheet using the one of at least two or more dither patterns selected in the selecting step; and wherein in the image forming step a plurality of dither patterns have screen angles of predetermined directions respectively that are substantially identical to each other.

15. A computer readable medium storing computer program instructions which when executed by a computer performs an image forming operation comprising the steps of:

recognizing a size of an area of an output image;

recognizing a size of an output sheet for the output image;

selecting one of at least two or more dither patterns for the output image based on the size of the area of the output image recognized in the output image size recognizing step and the size of the output sheet for the output image recognized in the output sheet size recognizing step;

forming the output image outputted onto a sheet using the one of at least two or more dither patterns selected in the selecting step; and wherein in the image forming step a plurality of dither patterns have screen angles of predetermined directions respectively that are substantially identical to each other.

16. An image forming apparatus, comprising:

an image forming device configured to form an output image by at least two or more dither patterns;

an image area size acquisition device configured to recognize a size of an area of the output image;

image contents acquisition device configured to recognize contents of the output image; and switching device configured to select one of the at least two or more dither patterns for the output image according to the size of the output image recognized by the image area size acquisition device and the contents of the output image recognized by the image contents acquisition device and to switch the image forming device so as to form the output image using the one of the at least two or more dither patterns.

17. An image forming method, comprising the steps of:

recognizing a size of an output image;

recognizing contents of the output image;

selecting one of at least two or more dither patterns for the output image based on the size of an area of the output image recognized in the image size recognizing step and the contents of the output image recognized in the image contents recognizing step; and forming the output image using the one of at least two or more dither patterns selected in the selecting step.

18. A computer readable medium storing computer program instructions which when executed by a computer performs an image forming operation comprising the steps of:

recognizing a size of an area of an output image;

recognizing contents of the output image;

selecting one of at least two or more dither patterns for the output image based on the size of the area of the output image recognized in the image size recognizing step and the contents of the output image recognized in the image contents recognizing step; and forming the output image using the one of at least two or more dither patterns selected in the selecting step.

* * * * *